United States Patent [19]

Machado

[11] Patent Number: 5,037,460
[45] Date of Patent: Aug. 6, 1991

[54] DISPOSABLE AIR FILTER

[75] Inventor: Joseph Machado, Attleboro, Mass.

[73] Assignee: Allied-Signal Inc., Morristown, N.J.

[21] Appl. No.: 255,671

[22] Filed: Oct. 6, 1988

[51] Int. Cl.$^5$ .............................................. B01D 46/00
[52] U.S. Cl. ...................................... 55/480; 55/484; 55/497; 55/502; 55/509
[58] Field of Search ................ 55/478, 480, 481, 484, 55/497, 502, 509, 521; 210/493.3

[56] References Cited

U.S. PATENT DOCUMENTS

| | | | |
|---|---|---|---|
| 2,111,906 | 3/1938 | Stewart | 55/481 |
| 2,962,121 | 11/1960 | Wilber | 55/480 |
| 2,973,832 | 3/1961 | Cook et al. | 55/502 |
| 3,012,631 | 12/1961 | Kaser | 55/497 |
| 3,104,966 | 9/1963 | Goulet et al. | 55/497 |
| 3,226,917 | 1/1966 | Donovan et al. | 55/502 |
| 3,440,807 | 4/1969 | Gaines, Jr. | 210/493.1 |
| 3,616,618 | 8/1969 | Gronholz | 55/337 |
| 3,672,130 | 6/1972 | Sullivan et al. | 55/337 |
| 3,710,562 | 1/1973 | McKenzie | 55/521 |
| 3,712,033 | 1/1973 | Gronholz | 55/509 |
| 3,778,985 | 12/1973 | Daigle et al. | 55/509 |
| 4,148,732 | 4/1979 | Burrow et al. | 55/509 |
| 4,204,960 | 5/1980 | Sugiyama et al. | 210/232 |
| 4,278,455 | 7/1981 | Nardi | 55/337 |
| 4,304,580 | 12/1981 | Gehl et al. | 55/482 |
| 4,312,651 | 1/1982 | Esaki et al. | 55/502 |
| 4,438,057 | 3/1984 | Sundseth | 55/497 |
| 4,692,177 | 9/1987 | Wright et al. | 55/499 |
| 4,826,518 | 5/1989 | Furrer et al. | 55/484 |

FOREIGN PATENT DOCUMENTS

| | | | |
|---|---|---|---|
| 1118530 | 11/1961 | Fed. Rep. of Germany | |
| 53-2763 | 1/1978 | Japan | 55/502 |
| 891853 | 3/1962 | United Kingdom | 55/521 |
| 1550831 | 8/1979 | United Kingdom | 55/498 |

Primary Examiner—Jay H. Woo
Assistant Examiner—C. Scott Bushey
Attorney, Agent, or Firm—Ken C. Decker; William N. Antonis

[57] ABSTRACT

A disposable air filter includes a pair of cover members which enclose an outlet body defining an outlet chamber communicating with an outlet tube. A pair of panel filter elements are supported on opposite sides of the outlet body. Fasteners interconnect the cover members so that they compress seals carried by the filter elements against the outlet body.

9 Claims, 3 Drawing Sheets

DISPOSABLE AIR FILTER

This invention relates to an air filter for filtering the combustion air used by an internal combustion engine.

BACKGROUND OF THE INVENTION

Existing internal combustion engine installations have an inlet air filter which includes a housing and a replaceable filter element for filtering the combustion air used by the engine. The present invention provides a throw-away air cleaner assembly in which a pair of filter elements are mounted within a throw-away plastic container. When the filter needs changing, the entire filter assembly is thrown away and a new one installed. The filter according to the present invention is particularly advantageous in certain applications of internal combustion engines, such as stationary or marine engines, which are often used in a corrosive environment in which it is often inconvenient to open the filter housing and replace the filter element. The housing in the present invention is preferably made of plastic or some other non-corrosive, inexpensive material. The housing is designed so that rain is deflected away from the inlet air openings. The air filter is installed on the end of the inlet air suction pipe, where it may be changed when necessary.

BRIEF DESCRIPTION OF THE DRAWING

These and other advantages of the present invention will become apparent from the following description, with reference to the accompanying drawings, in which.

DESCRIPTION OF THE PREFERRED EMBODIMENT

Figure 1:
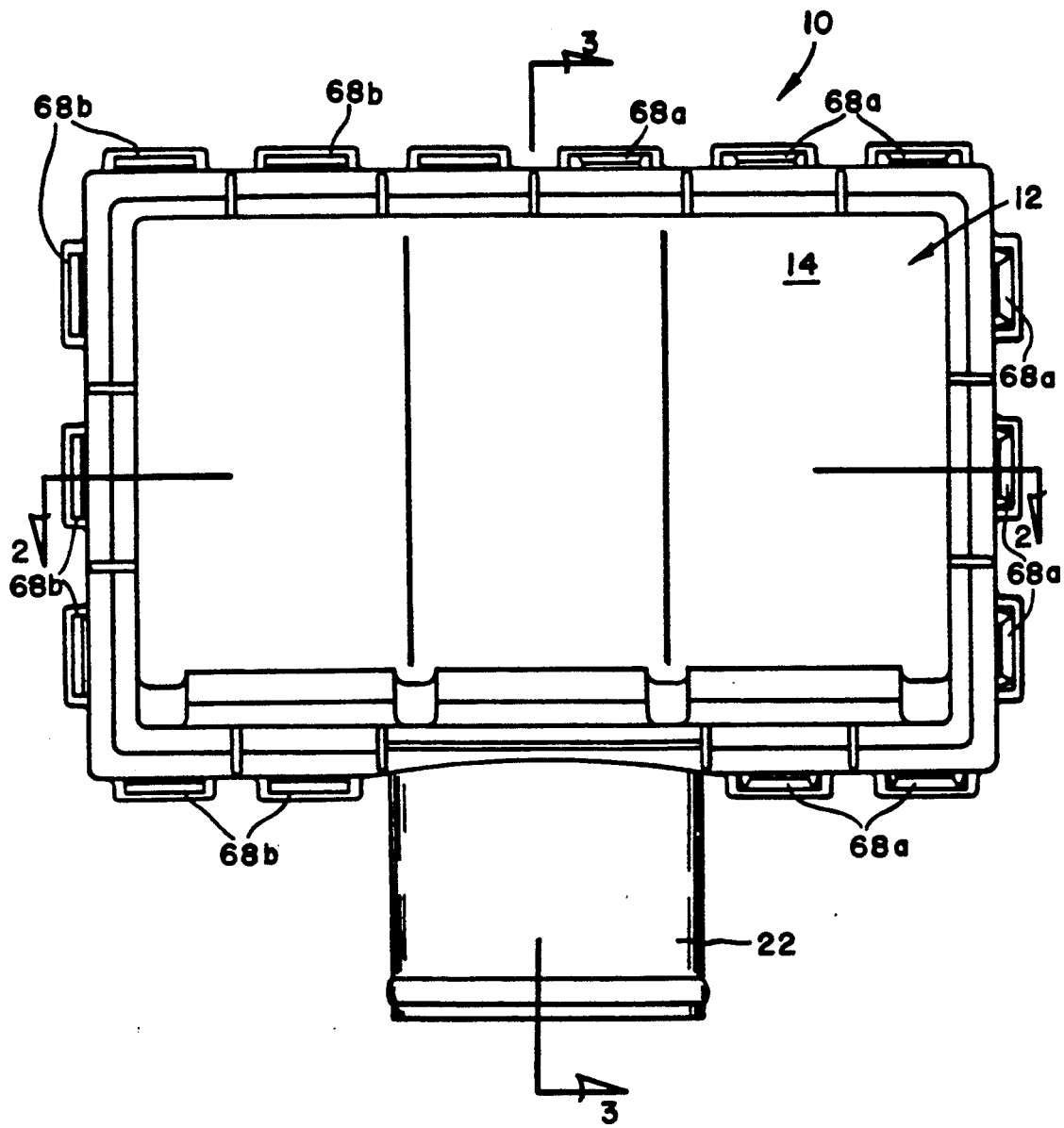
FIG. 1 is a plan view of an air filter assembly made pursuant to the teachings of the present invention.

Referring now to the drawings, an air cleaner assembly generally indicated by the numeral 10 includes a housing generally indicated by the numeral 12 consisting of a pair of substantially identical inlet covers 14, 16 and an outlet body 18. The outlet body 18 defines an outlet chamber 20 therewithin communicating with a tubular outlet opening 22. Tubular outlet opening 22 is adapted for mounting on a conventional inlet pipe connected to the induction air inlet of an internal combustion engine (not shown).

The outlet body 18 includes opposite surfaces 24, 25 which defines a pair of opposed filter element support areas 26 and 28 on opposite sides of the outlet body 18. A pair of filter elements 30, 32 are supported on the support areas 26, 28 respectively. Each of the filter elements are panel filter elements consisting of a longitudinally extending array of taperer pleats 34. Each of the pleats 34 extend between tips 36, which cooperate to define the upstream side of the filter elements 30, 32, and tips 38, which cooperate to define the downstream or outlet side of the filter elements 30, 32. Openings 40 are provided in the outer surfaces 24 on the opposite sides of the outlet body 18 to communicate the downstream side of the filter elements 30, 32 with the outlet chamber 20. Each of the filter elements 30, 32 includes a seal comprising a perimetrically extending band of sealing material 42, 44 which is compressed into sealing engagement with corresponding sealing support surfaces 46, 48 on the outer surfaces 24, 25 as will hereinafter be described.

Each of the inlet covers 14, 16 cooperate with the upstream side of a corresponding one of the filter elements 30, 32 to define corresponding inlet chambers 50, 52. The cover members 14, 16 include an outwardly tapering wall 51, 53 which taper away from the outlet body 18, and which terminate in an inwardly tapering portion 54, 56, which taper toward the outlet body 18. Inlet openings 58 are provided in the inwardly tapering walls 54, 56, to communicate ambient air into the corresponding inlet chambers 50, 52 which are defined by the corresponding walls 51, 54 and 53, 56 and the upstream side of the corresponding filter elements 30, 32.

Figure 2:
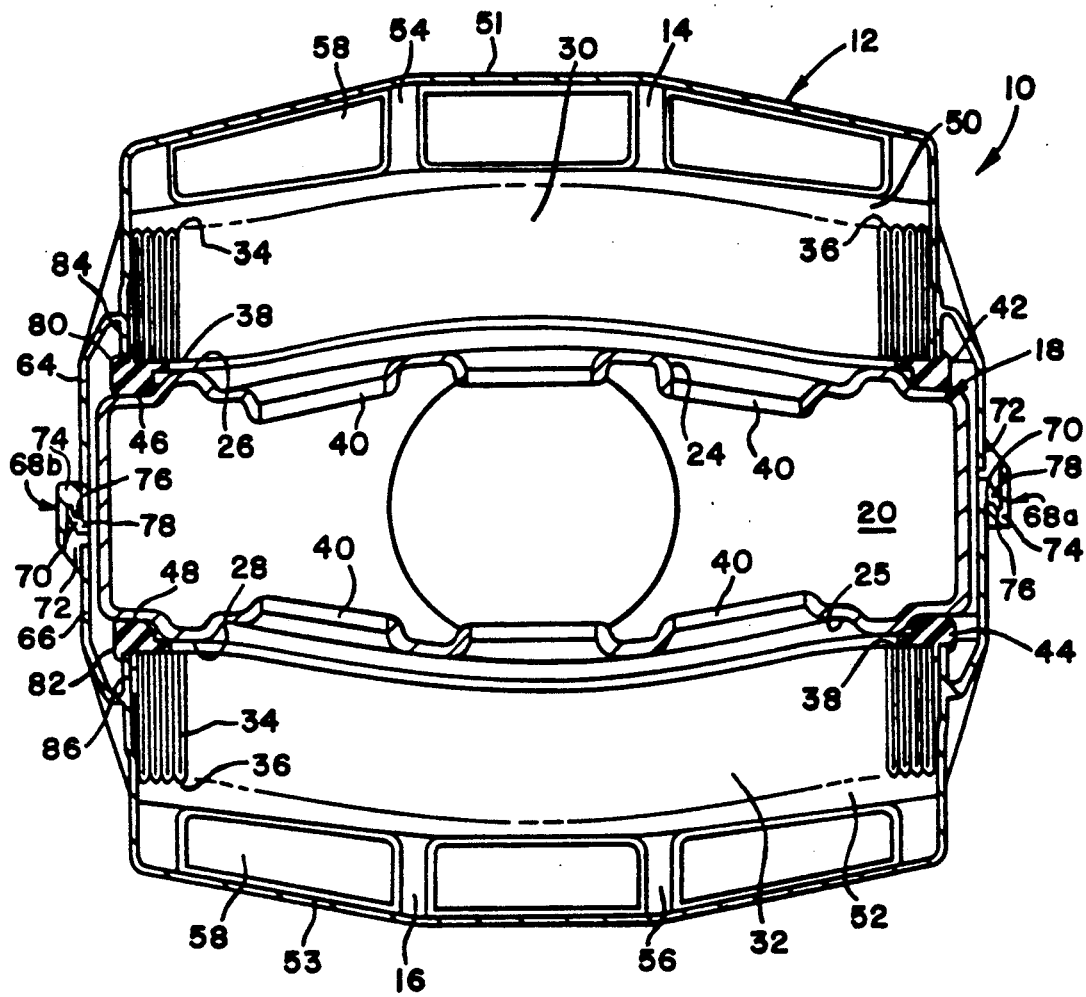
FIG. 2 is a cross-sectional view taken along line 2—2 of FIG. 1.
Figure 3:
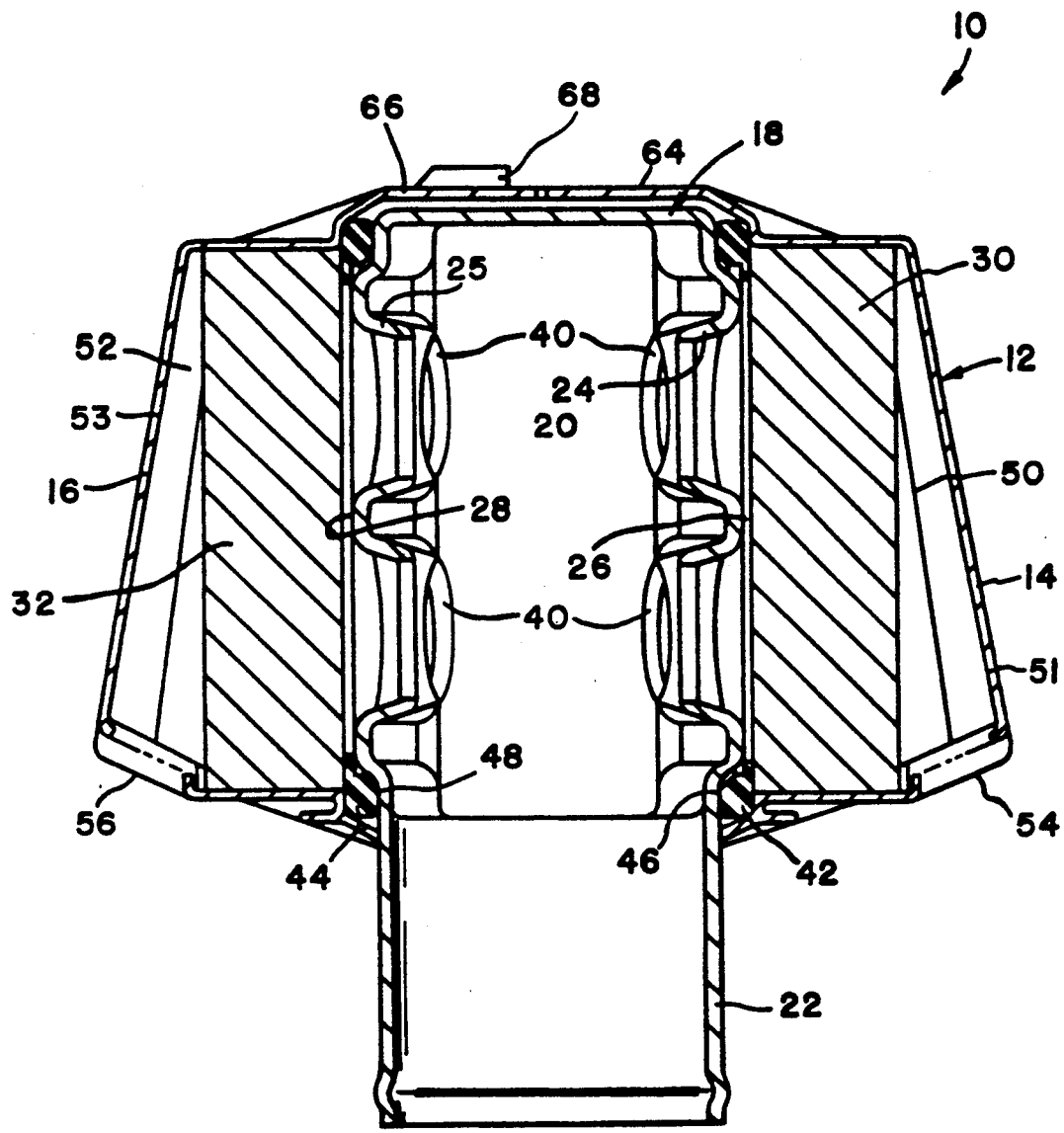
FIG. 3 is a cross-sectional view taken substantially along line 3—3 of FIG. 2.

The inlet covers 14, 16 further include cooperating side wall portions 64, 66 which are joined together by fastening means generally indicated by the numeral 68. The fastening means 68 consists of a barbed finger 70 which extends from one of the inlet covers 14, 16, and which is received in a recess 72 which is defined by a projecting wall 74 on the other of the inlet covers 14, 16. As can be seen in FIG. 2, the projecting wall 74 is provided with an engagement surface 76 which locking engages the barb 78 on the finger 70.

An important feature of the invention is that each of the inlet covers 14, 16 includes both recesses and fingers, and that these recesses and fingers are arranged symmetrically about the axis of the outlet opening 22, as extended through the housing 12. For example, in referring to FIG. 1, the fastening means 68a each have their finger 70 on the cover 16 with the corresponding recess 72 defined by wall 74 on the other cover. The fastening means labeled 68b in FIG. 1 are reversed such that the finger is on the cover 14. Accordingly, because of the symmetrical arrangement, the covers 14, 16 are identical, with the cover merely being reversed if it is used on the opposite side of the outlet body 18.

Each of the seals 42, 44 include a projecting portion 80, 82 which extends beyond the corresponding edge of the corresponding filter element 30 or 32. Each of the inlet cover members includes a seal engaging portion 84, 86 which engages the portion 80, 82 of the seals and clamps them against its corresponding seal supporting surface 46, 48. Accordingly, when the air cleaner 10 is assembled, the filter elements 30, 32 are placed upon their corresponding surfaces 24, 25, and the inlet covers are placed in their positions with the portions 84, 86 engaging the portion 82 of the seals. Pressure is then applied to both inlet covers, forcing the fingers 70 into the recesses 72 until the barb 78 engages the corresponding surfaces 76. The inlet covers 14, 16 are dimensioned so that, when the barb 78 engages surface 76, the portions 84, 86 exert substantial compressive pressure against the sealing seals 46, 48. This not only assures that the seals are maintained into sealing engagement with the outlet body 18, but the inherent resiliency of the seals also exerts a biasing force urging the barb 78 into locking engagement with the locking surface 76, thereby preventing the covers from coming loose from one another due to normal vibrations of the engine upon which the air filter 10 is installed.

When the air filter 10 is installed in the engine, the air induction pipe is normally vertical. Accordingly, when the tubular outlet opening is installed on the induction pipe, the tapering wall 50 is arranged so that rain or other particulate contaminants will be deflected away from the inlet openings 54, 56, thereby preventing undue moisture from being drawn in from the air induction pipe (not shown). In operation, engine suction causes communication of ambient air through the openings 54, 56 and through the filtering elements 30, 32, where the contaminant particles entrained therein are removed. The induction air then communicates through the openings 40 into the outlet chamber 20 and then through the tubular outlet opening 22 into the engine induction pipe.

I claim:

1. Air filter comprising an outlet body defining an outlet chamber therewithin and having an outlet opening communicating with said outlet chamber, said outlet body having an outer surface defining a pair of filter element support areas on said outer surface, a pair of filter elements mounted on said support areas, each of said filter elements having a downstream side adjacent said support areas and an opposite upstream side, said outer surface defining openings through said filter support areas to communicate the downstream side of each of said filter elements into said outlet chamber, each of said filter elements including sealing means for sealingly engaging said support surface, and a pair of inlet cover members, each of said cover members cooperating with said support surface to enclose a corresponding one of said filter elements and defining an inlet opening for communicating ambient air to the upstream side of each of said filter elements.

2. Air filter as claimed in claim 1, wherein each of said filter elements are panel filter elements consisting of a longitudinally extending array of tapered pleats, each of said pleats extending between tips of said pleats defining respectively the upstream and downstream sides of said filter elements, and a seal comprising a perimetrically extending band of sealing material circumscribing each of said filter elements, each of said beads being compressed into sealing engagement with said outlet body.

3. Air filter as claimed in claim 2, wherein each of said cover members includes a seal engaging portion engaging the seal to clamp the seal into sealing engagement with the outlet body.

4. Air filter as claimed in claim 2, wherein the boundaries of the filter elements are defined by an edge, said band of sealing material including a projecting portion projecting beyond said edge, each of said cover members including a seal engaging portion engaging the projecting portion to clamp the seal into sealing engagement with the outlet body.

5. Air filter as claimed in claim 4, wherein each of said cover members including fastening means for engagement with corresponding fastening means on the other cover member when said cover members are installed on the outlet body.

6. Air filter as claimed in claim 5, wherein each of said cover members include side wall portions cooperating with the side wall portions on the other cover member to enclose said filter elements and said outlet body when the cover members are installed.

7. Air filter as claimed in claim 6, wherein said fastening means includes fingers extending from the side wall portions of each cover member engaging corresponding recesses on the other cover member, and locking means responsive to the resiliency of said seals to maintain the fingers in the recesses.

8. Air filter as claimed in claim 7, wherein each of said cover members are provided with both fingers and recesses arranged symmetrically on the side wall portions.

9. Air filter as claimed in claim 4, wherein each of said cover members includes an outwardly tapering portion tapering away from said outlet body, said outwardly tapering portion terminating in an inwardly tapering portion tapering toward said outlet body, said inlet opening extending through said inwardly tapering portion.

* * * * *